United States Patent [19]

Cowan et al.

[11] Patent Number: 4,737,295

[45] Date of Patent: Apr. 12, 1988

[54] ORGANOPHILIC POLYPHENOLIC ACID ADDUCTS

[75] Inventors: Jack C. Cowan; Victor M. Granquist, both of Lafayette, La.; Roy F. House, Houston, Tex.

[73] Assignee: Venture Chemicals, Inc., Lafayette, La.

[21] Appl. No.: 887,360

[22] Filed: Jul. 21, 1986

[51] Int. Cl.$^4$ ............................. C09K 7/06; C07F 9/10
[52] U.S. Cl. ............................. 252/8.515; 252/8.511; 252/8.551; 260/403; 530/506
[58] Field of Search ............... 252/8.515, 8.511, 8.514, 252/8.551; 260/403; 530/506

[56] References Cited

U.S. PATENT DOCUMENTS

| | | | |
|---|---|---|---|
| 2,661,334 | 12/1953 | Lummus | 252/8.515 |
| 2,876,197 | 3/1959 | Watkins | 252/8.515 |
| 2,986,516 | 5/1961 | Reddie | 252/8.515 |
| 3,108,068 | 10/1963 | Weiss et al. | 252/8.515 |
| 3,168,475 | 2/1965 | Jordan et al. | 252/8.514 |
| 3,425,953 | 2/1969 | Cowan et al. | 252/8.514 X |
| 3,494,865 | 2/1970 | Andrews et al. | 252/8.515 |
| 4,421,655 | 12/1983 | Cowan | 252/8.515 X |

*Primary Examiner*—Herbert B. Guynn
*Attorney, Agent, or Firm*—Roy F. House

[57] ABSTRACT

Organophilic polyphenolic materials which are effective fluid loss control additives for oil base well-working fluids are prepared from a polyphenolic material and one or more phosphatides. Preferred phosphatides are phosphoglycerides obtained from vegetable oils, most preferably commercial lecithin. Preferred polyphenolic materials comprise one or more of: humic acid; lignosulfonic acid; lignins; phenolic condensates; tannins; the oxidized, sulfonated, or sulfomethylated derivatives of these polyphenolic materials; and the water soluble or colloidally dispersible salts of these polyphenolic materials or these derivatives thereof.

11 Claims, No Drawings

4,737,295

ORGANOPHILIC POLYPHENOLIC ACID ADDUCTS

FIELD OF THE INVENTION

The invention relates to organophilic derivatives of complex phenolic compounds, to methods for their manufacture, and to their use in oil base well working fluids.

BACKGROUND OF THE INVENTION

In the drilling of wells for oil and gas by the rotary method, it is common to use a circulating fluid which is pumped down to the bottom of the well through a drill pipe, where the fluid emerges through ports in the drilling bit. The fluid rises to the surface in the annular space between the drill pipe and the walls of the hole, and at the surface it is treated to remove cuttings and the like to prepare it for recirculation into the drill pipe. The circulation is substantially continuous while the drill pipe is rotated.

The present invention pertains to oil base drilling fluids or oil base muds which includes water-in-oil (invert) emulsions as well as oil base fluids containing only small amounts or no emulsified water.

An important feature of well working fluids of the class described is their ability to resist filtration. In most instances, when they are in actual use, whether as drilling fluids, packer fluids, fracturing or completion fluids, the well working fluid is in contact with a more or less permeable formation, such as, for example, sandstone, sandy shale and the like, with an effective balance of pressure such that the fluid tends to be forced into the permeable formation. When a well working fluid is deficient in its ability to resist filtration, then the solids in the fluid are held back by the permeable formation and build up as a filter cake or sludge on its surfaces, while the liquid per se of the well working fluid filters into the permeable formation. The filter cake or sludge thus formed is generally very undesirable. Moreover, the loss of oil to the formation is very expensive, not only because of the cost of the oil itself, but also due to the cost of maintaining the properties and composition of the fluid.

Various additives have been used or suggested for use as fluid loss additives to prevent or decrease this loss of fluid by filtration from oil base muds. Some of the first materials used for this purpose were asphalt and various modified asphaltic materials. The following patents disclose various amine derivatives of various polyphenolic compounds for use as fluid loss control additives (hereinafter sometimes referred to as FLCA) for oil muds: Jordan et al. U.S. Pat. Nos. 3,168,475: Jordan et al. 3,281,458: Beasley et al. 3,379,650: Cowan et al. 3,232,870: Cowan et al. 3,425,953: Andrews et al. 3,494,865; Andrews et al. 3,671,427; Andrews et al. 3,775,447: Kim 3,538,071; Kim 3,671,428; Cowan 4,421,655: Connell et al. 4,501,672: and Frost European Pat. Application No. 049,484.

As noted in the examples in the aforementioned patents, the amount of the organic amine or amide compounds reacted with the polymeric phenolic compounds disclosed is quite high, generally of the order of 75%–100% or more, based on the weight of the polymeric phenolic compound, although amounts from 20% to 200% are disclosed to be useful. Most of these FLCA possess poor dispersibility in well working fluids unless elaborate procedures are undertaken, such as the addition of a dispersant, heating, agitating under high shear or for extended periods of time, drying under low temperature conditions, flushing, preparation in oleaginous liquids, and the like. Moreover, the amine and amide compounds are relatively expensive to prepare and/or purchase, and thus these FLCA are quite expensive to produce.

SUMMARY OF THE INVENTION

We have now found that organophilic derivatives of polyphenolic materials can be prepared by reaction of the polyphenolic compound with a phosphatide, preferably commercial lecithin. These phosphatide/polyphenolic compound adducts are organophilic, relatively inexpensive to prepare, and thus are excellent low-cost fluid loss additives for oil-based working fluids.

PREFERRED EMBODIMENTS OF THE INVENTION

The novel FLCA of this invention comprises an organophilic material which is a phosphatide derivative of a polyphenolic acid or polyphenolic acid-containing material.

The polyphenolic materials useful in the practice of this invention include: humic acid; lignosulfonic acid; lignins; phenolic condensates; tannins; the oxidized, sulfonated, and sulfomethylated derivatives of the above mentioned polyphenolic compounds; graft polymers of these polyphenolic compounds with acrylic acid or precursors thereof; and the water soluble salts of these polyphenolic compounds or these derivatives or graft copolymers thereof. The following U.S. patents, incorporated herein by reference, all disclose various polyphenolic compounds which can be used to practice this invention: U.S. Pat. Nos. 2,831,022—sulfonated tannins; 3,232,870—lignosulfonates; 3,391,173—sulfomethylated tannins; 3,639,263—HCN modified lignosulfonates; 3,671,428—oxidized lignosulfonates; 3,700,728—sulfonated humic acids, lignite and oxidized coals; 3,726,850—ozone oxidized lignins; 3,956,140—sulfonated lignite, sulfonated phenolic condensates, and sulfomethylated phenolic condensates; 3,985,659—graft polymers of lignosulfonate and a polyacrylate; 4,069,034—humic acids; 4,088,640—ozone oxidized lignosulfonates; and 4,196,777—oxidized lignosulfonates. European Patent Application No. 072 445/A2 published 23.02.83, BW Mud Ltd. applicant, incorporated herein by reference, discloses graft polymers of lignite or humic acid with various acrylates.

The preferred polyphenolic compound is humic acid and the alkali metal salts thereof. Humic acid is a material of wide distribution and is present in soils, peat, and coals, particularly lignite or brown coal, and most particularly in the soft brown coal known as a leonardite. Humic acids are complex organic molecules that are formed by the breakdown of organic matter. Their exact structures are unknown, and they are extremely variable. The principal organic groups present are phenolic and carboxylic OH, aliphatic CH, carbonyl, conjugated carbonyl or aromatic $CH_2$ or $CH_3$ or ionic carboxyl, and possibly others. The average molecular weight of the humic acids is between 5,000 and 50,000. They have no x-ray or electron diffraction patterns and are therefore presumably amorphous.

The humic acids have a large cation exchange capacity which varies from 200 to 500 milliequivalents per 100 grams at pH 7 depending on the humus source.

Humic acids are colloids. When the cation exchange sites on the humic molecule are filled predominantly with other than hydrogen, the material is called humate. The humates of monovalent inorganic and ammonium ions are soluble in water, but the humates of multivalent cations are insoluble.

The term humic acid is used herein to include all of the colloidal acids derived from humus, including humic acid, ulmic acid and fulvic acid. Humic acid is soluble in alkali but insoluble in acid, methyl ethyl ketone, and methyl alcohol. Ulmic acid is soluble in alkali and methyl ethyl ketone but insoluble in methyl alcohol. Fulvic acid is soluble in alkali, methyl ethyl ketone and methyl alcohol. The term humic acid is also intended to mean humic acids which have been further oxidized to increase their carboxyl content. See for example, "Chemistry of Brown Coals. IV. Action of Oxygen in Presence of Alkali," R. A. Durie and S. Sternhill, Australian Journal of Applied Science, 9, No. 4, 369–369, 1958.

While humic acid is present in soils and peat, and may be extracted from them, for example, with dilute aqueous alkali, it is preferred to obtain humic acid for the purposes of this invention in the form of lignite of high alkali solubility, of which vast deposits are found throughout the world, including particularly, the United States, for example, in North Dakota, Montana, Texas, New Mexico, and California. While we do not mean to be limited thereby, we prefer a humic acid source having a solubility in dilute, aqueous sodium hydroxide of at least 50% by dry weight, as this provides a reasonable compromise between cost and efficacy in the final product.

The organophilic phosphatide which is useful in the practice of the invention is one or more phosphatides having the empirical formula $$R_1\text{—CO—O—CH}_2\text{—CH}(R_2)\text{—CH}_2\text{—Q} \qquad (I)$$

where $R_1$ is an aliphatic group containing from 8 to 29 carbon atoms; $R_2$ is selected from the group consisting of H, OH, $R_1COO$, and $OP(O)(O^-zM^{a+})OZ$; Q is selected from the group consisting of $R_1COO$ and $OP(O)(O^-zM^{a+})OZ$; Z is selected from the group consisting of $xM^{a+}$, $C_6H_6(OH)_5$ and $CH_2\text{—CH}(Y)\text{—N}(R_3)(R_4)(R_5)y(A^{b-})v$; Y is selected from the group consisting of H and $COO(wM^{a+})$; $R_3$, $R_4$, and $R_5$ are independently selected from the group consisting of H, aliphatic groups containing from 1 to 30 carbon atoms, and $R_6CO$; $R_6$ is an aliphatic group containing from 1 to 29 carbon atoms; M is a cation selected from the group consisting of H, an alkali metal, an alkaline earth metal, ammonium, and mixtures thereof; A is an anion of valence b; y=0 or 1; w, x and z=0 or 1/a where a is the valence of M; v=0 or 1/b; and where Q is $R_1COO$ only when $R_2$ is $OP(O)(O^-zM^{a+})OZ$.

Preferably $R_1$ contains from about 15 to about 17 carbon atoms, $R_2$ is selected from the group consisting of $R_1COO$ and $OP(O)(O^+zM^{a+})OZ$; and $R_3$, $R_4$, and $R_5$ are independently selected from the group consisting of H, $CH_3$, and $R_1CO$.

Such phosphatides are present in amounts up to about 5% by weight in certain crude vegetable oils, which are principally triglycerides of formula (I) wherein both $R_2$ and Q are $R_1COO$ where $R_1$ is an aliphatic group containing from 15 to about 17 carbon atoms. Various refining procedures, well known in the art, may be utilized to isolate the various individual phosphatides or to concentrate the phosphatides as a group (mixture of phosphatides). Thus crude commercial lecithin from soybean oil contains from about 30% to about 50% by weight triglyceride and from about 50% to about 70% by weight of a mixture of phosphatides, principally phosphatidyl choline ($\alpha$-form and $\beta$-form), phosphatidyl ethanolamine ($\alpha$-form and $\beta$-form), N-Acyl phosphatidyl ethanolamine ($\alpha$-form and $\beta$-form), phosphatidyl serine ($\alpha$-form and $\beta$-form), phosphatidyl inositol ($\alpha$-form and $\beta$-form), phosphatidic acid, minor amounts of various other phosphatides, or the alkali metal or alkaline earth metal salts thereof. In the $\alpha$-form the phosphate ester group $OP(O)(O^-zM^{a+})OZ$ is on the end carbon (Q) whereas in the $\beta$-form the phosphate ester group is on the middle carbon atom ($R_2$ group).

Thus preferably the organophilic phosphatide is a mixture of phosphatides having the empirical formula $$R_1COO\text{—CH}_2\text{—CH}(R_2)\text{—CH}_2\text{—Q} \qquad (II)$$

where $R_1$ is an aliphatic group containing from about 15 to about 17 carbon atoms; $R_2 = c\ R_1COO + d\ OP(O)(O^-zM^{a+})OZ$; $Q = d\ R_1COO + c\ OP(O)(O^-zM^{a+})OZ$; Z is selected from the group consisting of $xM^{a+}$, $C_6H_6(OH)_5$ and $CH_2\text{—CH}(Y)\text{—N}(R_3)(R_4)(R_5)y(A^{b-})v$; Y is selected from the group consisting of H and $COO(wM^{a+})$; $R_3$, $R_4$, and $R_5$ are independently selected from the group consisting of H, $CH_3$, and $R_1CO$; M is a cation selected from the group consisting of H, an alkali metal, an alkaline earth metal, ammonium, and mixtures thereof; y=0 or 1; A is an anion of valence b; w, x, and z=0 or 1/a where a is the valence of M; v=0 or 1/b; c≥0; d≥0; and c+d=1.

Such phosphatides wherein: $Z = CH_2CH_2N(CH_3)_3$ are called phosphatidyl choline (or lecithin); $Z = CH_2CH_2NH_3$ or $CH_2CH_2NH_2$ are called phosphatidyl ethanolamine (or cephalin); $Z = CH_2CH(COO^-)NH_3$ or $CH_2CH(COOH)NH_2$ are called phosphatidyl serine; $Z = CH_2CH_2NH\text{—CO—}R_1$ are called N-Acylphosphatidyl ethanolamine; $Z = C_6H_6(OH)_5$ are called phosphatidyl inositol; and $Z = H$ are called phosphatidic acid. The amounts of these phosphatides which are present in the phosphatide mixture of various vegetable oils have been variously disclosed to be as follows:

| Phosphatide | % Phosphatide, Based on the Weight of all Phosphatides, in | | | |
|---|---|---|---|---|
| | Soybean Oil | Corn Oil | Cottonseed Oil | Sunflower Oil |
| Choline | 28–32 | 41–46 | 0–33 | 52 |
| ethanolamine | 12–31 | 4–5 | 19–39 | 20 |
| inositol | 20–32 | 19–23 | 6–37 | 26 |
| serine | — | 0–3 | 0–33 | — |
| acid | — | 14–16 | — | 2 |
| other | 15–18 | 12–16 | 8–25 | — |

Thus a preferred phosphatide mixture suitable for use in this invention contains from about 0% to about 52% phosphatidyl choline, from about 4% to about 39% phosphatidyl ethanolamine, from about 6% to about 37% phosphatidyl inositol, from about 0% to about 33% phosphatidyl serine, from about 0% to about 16% phosphatidic acid, and from about 0% to about 25% of various other phosphatides. The most preferred phosphatide mixture is commercial soybean lecithin.

The organophilic modifier useful in this invention preferably contains from about 50% to about 100% by weight of organophilic phosphatides and from about 0% to about 50% by weight of a vegetable oil triglyceride. Most preferably the organophilic modifier is commercial lecithin which contains from about 30% to about 50% of the vegetable oil from which the lecithin is concentrated, from about 35% to about 70% of a mixture of phosphatides having the empirical formula $$R_1-CO-O-CH_2-CH(R_2)-CH_2-Q \qquad (III)$$

where: $R_1$ is an aliphatic group containing from about 15 to about 17 carbon atoms; $R_2$ is selected from the group consisting of $R_1COO$ and $OP(O)(O^-zM^{a+})OZ$; Q is selected from the group consisting of $R_1COO$ and $OP(O)(O^-zM^{a+})$; Z is selected from the group consisting of $xM^{a+}C_6H_6(OH)_5$, and $CH_2-CH(Y)-N(R_3)(R_4)(R_5)y(Ab^-)v$; Y is selected from the group consisting of H and $COO(wM^a)$; $R_3$, $R_4$, and $R_5$ are independently selected from the group consisting of H, $CH_3$, and $R_1CO$; M is a cation selected from the group consisting of H, an alkali metal, an alkaline earth metal, ammonium, and mixtures thereof; A is an anion of valence b; y=0 or 1; w, x and z=0 or 1/a where a is the valence of M; v=0 or 1/b; and Q is $R_1COO$ only when $R_2$ is $OP(O)(O^-zM^{a+})OZ$; and from 0% to about 18% of other phosphatides.

While the ammonium-containing phosphatides may be in the internally neutralized zwitterionic form (i.e., v=o, y=1, and either w=0 or z=0), it is believed that such phosphatides react with the polyphenolic material by substitution because of the insolubility of the resulting organophilic polyphenolic adduct. Also, since inorganic phosphates have been demonstrated to irreversibly complex with humic acid, a similar complex may be formed between the lignite and the phosphatides. In any case, regardless of the mechanism of the formation of the organophilic polyphenolic material, there is formed a phosphatide-polyphenolic material adduct which is an effective fluid loss additive for oil base well working fluids.

Generally speaking, the organophilic polyphenolic materials of this invention may be produced by bringing together the polyphenolic material in either acid or base form and the phosphatide in its base or acid form, respectively. The basic groups and the acidic groups are believed to neutralize each other with salt formation and the large organophilic portion of the phosphatide and any organophilic carrier such as vegetable oil triglycerides are sorbed onto the surface of the polyphenolic material to form the organophilic polyphenolic material. The polyphenolic material may be converted to a water soluble or colloidally dispersible salt by reaction with a suitable base, generally an alkali metal, alkaline earth metal, or ammonium base, most preferably an alkali metal base such as sodium hydroxide, potassium hydroxide, and the like, or a basic salt such as an alkali metal borate, carbonate, and the like salts as is well known in the art. The phosphatide is then caused to be present in the form of a simple salt. Thus the amine groups in the phosphatide may be reacted with an acid such as hydrochloric, acetic, phosphoric, sulfuric and the like to give the corresponding ammonium salt.

For the preparation of solid, particulate organophilic polyphenolic adducts of this invention, generally sufficient water should be present to insure intimate contact of the phosphatide and the polyphenolic material, such as at least about 20% by weight, based on the weight of the polyphenolic compound, preferably from about 20% to about 35%, same basis. Generally intensive mixing is sufficient for reaction. Suitable intensive mixers which are capable of handling semi-solid materials are pug mills, extruders, ribbon blenders, Littleford Bros. mixer, Martin mixer, and the like apparatus. Water contents less than about 60% by weight of the organophilic polyphenolic adduct will generally produce a semi-solid material. Thereafter the organophilic polyphenolic adduct is preferably dried to less than about 20% water and ground to produce a free-flowing powder. Alternatively, higher water contents generally produce slurries of the organophilic polyphenolic adduct from which the adduct may be recovered by spray drying, filtration, and the like known processes.

In a preferred slurry process, the polyphenolic material is dispersed in hot water with an alkali metal base to form a basic solution or suspension, the phosphatide added, and at least sufficient acid added to neutralize the alkali metal base.

The organophilic polyphenolic materials can be prepared in the presence of an organic liquid rather than an aqueous liquid. Thus the polyphenolic compound and the phosphatide can be reacted together such as by high shear mixing at temperatures up to the boiling point of the mixture in various organic liquids, such as petroleum oils or refined fractions thereof, generally paraffinic, aromatic, and naphthenic hydrocarbons of various molecular weights, or mixtures thereof. In this process the phosphatide can be caused to be present in an amount in excess of the amount required io form the organophilic polyphenolic adduct. There is thus obtained a mixture of the organophilic polyphenolic adduct and the phosphatide in the organic liquid. Such a mixture can be used as a combination additive in oil base drilling fluids to decrease the fluid loss and decrease the tendency of inert solids in the drilling fluid to water wet.

The minimum amount of phosphatide reacted with the polyphenolic material need only be sufficient to render the polyphenolic material organophilic. For the purposes of this invention, the polyphenolic material is considered organophilic when it is wetted by the organic liquid when admixed with a mixture of water and an insoluble organic liquid. Generally depending upon the particular polyphenolic material and its method of preparation, the minimum amount of phosphatide will be about 2.5% by weight based on the weight of the polyphenolic acid-containing material. The maximum amount of phosphatide reacted with the polyphenolic material is limited by the method of preparation, since concentrations of phosphatides in excess of that required to react by charge neutralization and surface adsorption provide enhanced organophilic properties. Thus when utilizing a high shear, semi-solid process as disclosed hereinbefore, the maximum amount of phosphatide which may be caused to be present in the organophilic polyphenolic material will be about 20% by weight, based on the weight of the polyphenolic material. Amounts of phosphatide substantially above 20% by weight may produce a sticky, gummy solid which cannot be easily handled. When utilizing a slurry-type process, the maximum amount of phosphatide will be in the range from about 50% to about 100% by weight, based on the weight of the polyphenolic acid-containing material, depending on the particular polyphenolic material and its purity.

When utilizing commercial lecithin as the phosphatide, which contains from about 30% to about 50% by weight of the vegetable oil from which the phosphatide is obtained, there is preferably utilized from about 5% to about 150% commercial lecithin, based on the weight of the moisture free-polyphenolic acid-containing material, most preferably from about 10% to about 35% based on the weight of the moisture free-polyphenolic acid-containing material.

It may be desired to improve the dispersibility or solubility of the organophilic polyphenolic material in certain oleaginous liquids by incorporating therein one or more nitrogen-containing organic compounds containing at least one alkyl, alkenyl, or acyl radical having from about 16 to about 30 carbon atoms in a straight chain such as the amines, amine salts, quaternary ammonium compounds, amides, and amide-amines (partial amides) disclosed in the prior art for the modification of polyphenolic materials. Exemplary of such nitrogen-containing organic compounds are:

(i) fatty ammonium compounds having the empirical formula $$R_1R_2R_3R_4N^+A^-$$

where: $R_1$, $R_2$, and $R_3$ are independently selected from the group consisting of H, aliphatic groups containing 1 to about 30 carbon atoms, and benzyl; $R_4$ is an aliphatic group containing from about 16 to about 30 carbon atoms; and $A^-$ is a charge balancing anion, preferably a halogen, most preferably chloride;

(ii) fatty polyamides or amide-amines which are the reaction products of a fatty acid or fatty acid derivative with an alkylene diamine or polyalkylene polyamine containing up to about 9 amine groups, having the empirical formula $$R_1R_2N\,[(CH_2)_n\!-\!N(R_2)]_x\,(CH_2)_n\!-\!NHR_2$$

where: $R_1$ is H, $C_{2-6}$ hydroxyalkyl, or an aliphatic group containing from 1 to 30 carbon atoms; $R_2$ is selected from the group consisting of H and $R_3CO$; $R_3$ is an aliphatic group containing from about 15 to about 29 carbon atoms; n is an integer from 2 to 6, preferably 2 or 3; x is 0 or an integer from 1 to about 7; provided that at least one $R_2$ radical is $R_3CO$; and (iii) mixtures thereof.

The preferred amount of the nitrogen-containing organic compound incorporated into the organophilic polyphenolic material of this invention may be from 0% to about 15% by weight, based on the weight of the polyphenolic material, most preferably from about 2% to about by weight.

Additionally, it may be desireable to improve the dispersibility or solubility of the organophilic polyphenolic material of this invention in certain oleaginous liquids by incorporating therein a polyvalent metallic cation compound of the type disclosed in Cowan U.S. Pat. No. 4,421,655, incorporated herein by reference. Non-limiting illustrative examples of suitable polyvalent cation compounds include calcium oxide, calcium hydroxide, calcium chloride, calcium acetate, calcium bromide, magnesium chloride, magnesium oxide, magnesium hydroxide, magnesium sulfate, ferric chloride, ferrous sulfate, zinc chloride, zinc sulfate, nickelic chloride, chromic chloride, aluminum chloride, aluminum sulfate, and the like. The preferred polyvalent cation compound is selected from the group consisting of calcium oxide, calcium hydroxide, magnesium oxide, magnesium hydroxide, and mixtures thereof, most preferably calcium hydroxide.

The preferred amount of the polyvalent cation compound incorporated into the organophilic polyphenolic material of this invention is from 0% to about 15% by weight based on the weight of the moisture-free organophilic polyphenolic material, most preferably from about 2% to about 10%.

In a most preferred embodiment of this invention, there is added to the organophilic polyphenolic material of the invention, before drying thereof, a solid diluent in an amount sufficient to improve the handling characteristics of the material. Suitable diluents which may be used, for example and not by way of limitation, are kaolin, diatomaceous earth, silica, calcium carbonate, ground vegetable by-products such as bagasse, and the like. The preferred diluent is a hydrophobic, organophilic, water wettable fibrous material as disclosed in Cowan et al. U.S. Pat. No. 4,428,843, incorporated herein by reference, most preferably the hydrophobic, organophilic, water wettable cotton as disclosed in Cowan et al. U.S. Pat. No. 4,404,107, incorporated herein by reference.

The amount of the solid diluent added to the organophilic polyphenolic material will generally range from 0% up to about 35% by weight of the moisture-free organophilic polyphenolic material, preferably in the range from about 5% to about 25%.

The phosphatides utilized in this invention are also uniquely suitable for rendering other colloidal materials organophilic. Thus various clays such as the swelling smectite group clay minerals, such as montmorillonite, bentonite, hectorite, saponite and the like, and non-swelling clays such as attapulgite and sepiolite, may be converted to organophilic clays which have the property of dispersing in, or being capable of being dispersed in, various organic liquids. Alternatively various hydrophilic polymers such as anionic or cationic derivatives of starch or cellulose, natural polysaccharide gums, and synthetic polymers can be rendered organophilic by reaction with phosphatides. Non-limiting examples of such classes of polymers are carboxymethyl cellulose, cellulose sulfate, carboxymethyl starch, xanthan gum, guar gum, alginates, carrageenan, karaya gum, locust bean gum, and water soluble polymers containing one or more unsaturated monomers selected from the group consisting of acrylic acid, methacrylic acid, vinyl sulfonic acid, maleic acid, vinyl compounds containing heterocyclic nitrogen-containing groups, (meth) acrylamido alkyl sulfonic acid, and the water soluble salts thereof.

The organophilic polyphenolic adducts of this invention may be used as fluid loss control additives in oil based well working fluids. They may be used as produced, but preferably after drying and grinding as disclosed hereinbefore. The FLCA are easily soublized or dispersed in oil base well-working fluids with the normal agitation available where such fluids are prepared, such as at liquid "mud" plants or at the location where the well-working fluid will be used.

The oil which forms a continuous phase of the well-working fluid is a petroleum (mineral) oil, and most generally is an ordinary diesel oil, although it may be rather lighter, such as kerosene, or somewhat heavier, such as fuel oil, white oils, or crude oil, as is well known in the art. In some cases the sole constituents of the well-working fluids may be simply a petroleum oil and the FLCA. The latter may be present from as little as 5 kg/m³ to as high as 150 kg/m³. The beneficial effect on fluid loss of the use of the FLCA may be observed even at the lowest concentration. This is especially the case when the FLCA is added to the well-working fluids containing other additives, of types to be mentioned hereinbelow.

Frequently, the well-working fluids will contain other additives, a common one being water, often present from as little as 2% or 3% by volume to as great as 40% to 60% by volume. It is desirable and common to use a suitable emulsifying agent, which may be the calcium salt of an inexpensive fatty acid, e.g., calcium tallate, to emulsify the water in the oil. An important feature of my invention, however, is that the FLCA are excellent emulsifying agents for any water which may be present in the well-working fluids. It is important that such water be kept in the form of a good stable water-in-oil emulsion.

The presence of water in the well-working fluids serves to increase the density of the fluid somewhat since the water is heavier than the oil used; and it also helps to reduce filtration. Also it lowers the cost of the well-working fluid which is often an important item when large volumes are used. Often water soluble salts such as calcium chloride are added to the aqueous phase.

Weighting materials are routinely used in well-working fluids where needed, such as ground barite, calcium carbonate, siderite, iron oxide, ilmenite and the like. Suspending agents and viscosifiers such as organophilic clays, asphalt, polymers and the like are commonly employed. Moreover, the well-working fluids may contain various oil soluble or dispersible materials which function to keep the solids in the well-working fluid from being wet with water.

Dispersants for organophilic polyphenolic compounds such as those disclosed in Beasley et al. U.S. Pat. Nos. 3,379,650 and Cowan et al. 3,425,953 may be added to the well-working fluids but generally they are not needed as dispersants since the FLCA of my invention are readily soluble or dispersible in well-working fluids.

Addition of one or more amino compounds to the well-working fluid may advantageously increase the thermal stability and emulsion stability of the well-working fluid.

The following non-limiting examples illustrate the results and benefits obtainable utilizing the FLCA of this invention in well-working fluids as well as illustrating the preferred method of preparing the FLCA. In the examples, all percentages are by weight unless otherwise indicated. All data were obtained utilizing the American Petroleum Institute's recommended testing procedures as set forth in API RP 13B.

EXAMPLE 1

1000 parts of North Dakota lignite containing 10% moisture and 75% humic acid, moisture free basis, were mixed for 15 minutes in a Littleford Mixer with an aqueous solution containing 250 parts of water and 40 parts of concentrated sulfuric acid. Thereafter 50 parts of commercial soybean lecithin (CSL) were added slowly and mixed 15 minutes. A 100 part sample, #1A, was removed and separately intimately mixed with 6.0 parts hydrated lime. 46 parts of CSL were then added and mixed an additional 15 minutes. A 100 part sample, #1B, was removed and separately mixed with 5.8 parts hydrated lime. 44 parts of CSL were added and mixed an additional 15 minutes. A 100 part sample, #1C, was removed and separately mixed with 5.6 parts hydrated lime. 41 parts of CSL were then added and mixed an additional 15 minutes. Thereafter 63 parts of hydrated lime were added and mixed an additional 10 minutes, sample #1D. Thus all samples contained 9.0% hydrated lime, based on the weight of the moisture free lignite. The samples contained the following concentrations of CSL, based on the weight of the moisture free lignite: #1A—5.55%; #1B—13.8%; #1C—19.6%; and #1D—25.4%. All samples were dried to about 10% moisture content in a forced draft oven, and ground.

Samples #1A—#1D were evaluated for their ability to decrease the fluid loss of Mentor-28 mineral oil by mixing the oil with 31.6 kg/m³ of sample for 10 minutes with a Multimixer. The API fluid loss at room temperature obtained after 30 minutes filtration was as follows: #1A—44cm³; #1B—5.0 cm³ #1C—1.5cm³; #1D—1.5 cm³.

Samples #1A—#1D were evaluated at a concentration of 28.5 kg/m³ for their effect on the properties of an invert oil emulsion drilling fluid having an oil/water ratio of 80/20 in which the oil was MENTOR 28 mineral oil. The data obtained are given in Table 1.

The data indicate that the commercial soybean lecithin modified lignite samples effectively decreased the high temperature fluid loss of this oil base drilling fluid without adversely affecting other properties of this drilling fluid.

TABLE 1

| | 28.5 kg/m³ Sample # | | | | |
|---|---|---|---|---|---|
| | None | 1A | 1B | 1C | 1D |
| Initial Properties | | | | | |
| Apparent Viscosity, cp. | 60 | 61 | 62 | 65 | 59 |
| Yield Point, kg/m² | 1.220 | 1.513 | 1.465 | 1.367 | 1.416 |
| 10-Second Gel Strength, kg/m² | 0.781 | 0.732 | 0.586 | 0.488 | 0.586 |
| 5-minute Gel Strength, kg/m² | 1.123 | 1.465 | 1.123 | 0.976 | 0.976 |
| Emulsion Stability, v. | 1860 | 1840 | 1860 | 1820 | 2000+ |
| After Rolling for 16 Hours at 350° F. | | | | | |
| Apparent Viscosity, cp | 68 | 74 | 70 | 69 | 65 |
| Yield Point, kg/m² | 1.318 | 1.367 | 0.879 | 0.439 | 1.220 |
| 10-Second Gel Strength, kg/m² | 0.635 | 0.635 | 0.195 | 0.098 | 0.439 |
| 5-Minute Gel Strength, kg/m² | 1.220 | 1.757 | 0.976 | 0.195 | 1.562 |
| Emulsion Stability, v. | 1320 | 1210 | 1120 | 1060 | 1320 |
| HT-HP Fluid Loss at 300° F., cm³ | 31 | 19 | 29 | 21 | 14 |

EXAMPLE 2

1000 parts of North Dakota lignite containing 10% moisture and 75% humic acid, moisture free basis, were mixed for 15 minutes in a Littleford mixer with an aqueous solution containing 250 parts of water and 40 parts of concentrated sulfuric acid, and with 50 parts of VEN-FYBER 201. The VEN-FYBER 201, which is a hydrophobic, organophilic, water wettable cotton having a particle size such that at least 90% by weight of the product in a 10% by weight water suspension passes through a 100 mesh U.S. sieve, as disclosed in U.S. Pat. No. 4,404,107, incorporated herein by reference, was added to improve the flowability of the particulate organophilic lignite samples obtained. Thereafter 200 parts of commercial soybean lecithin (CSL) were added and mixed 30 minutes. A 100 part sample was removed, #2A. 75 parts of hydrated lime were added and mixed 10 minutes. A 100 part sample was removed, #2B. Then an additional 70 parts of hydrated lime were added and mixed an additional 10 minutes, sample #2C. All samples were dried to about 10% moisture content and ground to give particulate, free flowing powders. The samples contained 22.2% by weight CSL, based on the weight of moisture free lignite. The samples also contained the following concentrations of lime, based on the weight of the moisture free organophilic lignite (lignite plus CSL): #2A =0%; #2B—7.3%; #2C—14.6%.

These samples were evaluated as in Example 1. The API fluid loss at room temperature at a concentration of 31.6 kg/m³ in MENTOR 28 was as follows: #2A—1.0 cm³; #2B—1.0 cm³; #2C—1.5 cm³. The data obtained in the oil base mud are given in Table 2.

TABLE 2

|  | 28.5 kg/m³ Sample # | | | |
| --- | --- | --- | --- | --- |
|  | None | 2A | 2B | 2C |
| Initial Properties |  |  |  |  |
| Apparent Viscosity, cp. | 60 | 86 | 71 | 75 |
| Yield Point, kg/m² | 1.220 | 1.123 | 1.465 | 1.465 |
| 10-Second Gel Strength, kg/m² | 0.781 | 0.537 | 0.488 | 0.586 |
| 5-Minute Gel Strength, kg/m² | 1.123 | 1.025 | 0.976 | 1.123 |
| Emulsion Stability, v. After Rolling for 16 Hours at 350° F. | 1860 | 1780 | 1680 | 1680 |
| Apparent Viscosity, cp. | 68 | 59 | 58 | 68 |
| Yield Point, kg/m² | 1.318 | 0.928 | 1.074 | 0.976 |
| 10-Second Gel Strength, kg/m² | 0.635 | 0.195 | 0.488 | 0.342 |
| 5-Minute Gel Strength, kg/m² | 1.220 | 0.976 | 1.367 | 1.367 |
| Emulsion Stability, v. | 1320 | 1220 | 1150 | 1160 |
| HT-HP Fluid Loss at 300° F., cm³ | 31 | 16 | 23 | 20 |

EXAMPLE 3

Organophilic lignites were prepared by the process of Example 2A using the amounts of materials indicated in Table 3, except that a partial amide was used as a replacement for a portion of the commercial soybean lecithin (SL), and two samples were prepared without the sulfuric acid. The partial amide is the reaction product of a mixture of polyethylenepolyamines and tall oil fatty acid in which from about 70% to about 80% of the amine groups are amidated. The polyethylenepolyamines are the residue which is obtained after removal of the magor quantities of ethylene diamine, diethylene triamine, triethylene tetrrmine, and tetraethylene pentamine. The data obtained are given in Table 3.

TABLE 3

| Sample Number | 3A | 3B | 3C | No Additive |
| --- | --- | --- | --- | --- |
| Parts N.D. lignite | 1000 | 1000 | 1000 |  |
| Parts Water | 250 | 250 | 250 |  |
| Parts Concentrated H₂SO₄ | 0 | 0 | 40 |  |
| Parts VEN-FYBER 201 | 50 | 50 | 50 |  |
| Parts CSL | 100 | 180 | 180 |  |
| Parts Partial Amide | 100 | 20 | 20 |  |
| Parts Lime | 50 | 50 | 80 |  |
| API Fluid Loss at R.T., cm³ | 0.5 | 0.5 | 0.5 |  |
| Initial Properties |  |  |  |  |
| Apparent Viscosity, cp. | 47 | 47 | 48 | 48 |
| Yield Point, kg/m² | 1.025 | 0.693 | 0.928 | 0.683 |
| 10-Second Gel Strength, kg/m² | 0.342 | 0.195 | 0.293 | 0.098 |
| Emulsion Stability, v. After Rolling at 350° F. for 16 Hours | 1800 | 1720 | 1840 | 2000+ |
| Apparent Viscosity, cp. | 61 | 60 | 72 | 57 |
| Yield Point, kg/m² | 0.293 | 0.293 | 0.293 | 0.244 |
| 10-Second Gel Strength, kg/m² | 0.049 | 0.098 | 0.098 | 0.049 |
| 5-Minute Gel Strength, kg/m² | 0.586 | 0.098 | 0.342 | 0.049 |
| Emulsion Stability, v. | 980 | 880 | 940 | 750 |
| HT-HP Fluid Loss at 300° F., cm³ | 40 | 57 | 27 | 66 |

The organophilic polyphenolic compositions of this invention have utility in other organic liquids other than oil base drilling fluids. Thus they may be useful in printing inks, foundry mold and core sands, foundry mold and core washes, coatings, agricultural sprays, and other systems containing a major proportion of an oleaginous liquid.

The most preferred process for preparing the organophilic polyphenolic compositions of this invention is indicated in the examples wherein the polyphenolic material is intensively mixed with the phosphatide mixture, preferably commercial lecithin, in the presence of water and an acid, preferably selected from the group consisting of sulfuric acid, hydrochloric acid, phosphoric acid, acetic acid, and mixtures thereof, and preferably in an amount to provide a pH of less than about 4. In the most preferred process this intensive mixing under acidic conditions is followed by addition of a base, preferably lime, to raise the pH of the composition, when suspended in water, above about six.

What is claimed is:

1. An oil base well working fluid comprising a major proportion of oil and a minor proportion but sufficient to substantially decrease the fluid loss of said fluid of an organophilic polyphenolic material comprising an adduct of a polyphenolic acid-containing material, or a water soluble or colloidally dispersible salt thereof, and one or more phosphatides having the empirical formula

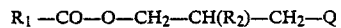

$$R_1-CO-O-CH_2-CH(R_2)-CH_2-Q$$

where: $R_1$ is an aliphatic group containing from 8 to 29 carbon atoms; $R_2$ is selected from the group consisting of H, OH, $R_1COO$, and $OP(O)(O^-zM^{a+})OZ$; Q is selected from the group consisting of $R_1COO$ and $OP(O)(O^-zM^{a+})OZ$; Z is selected from the group consisting of $xM^a$, $C_6H_6(OH)_5$ and $CH_2-CH(Y)-N(R_3)(R_4)(R_5)y(A^{b-})v$; Y is selected from the group consisting of H and $COO(wM^a)$; $R_3$, $R_4$, and $R_5$ are independently selected from the group consisting of H, aliphatic groups containing from 1 to 30 carbon atoms, and $R_6CO$; $R_6$ is an aliphatic group containing from 1 to 29 carbon atoms; M is a cation selected from the group consisting of H, an alkali metal, an alkaline earth metal, ammonium, and mixtures thereof; A is an anion of valence b; y=0 or 1; w, x and z=0 or 1/a where a is the valence of M; v=0 or 1/b; and where Q is $R_1COO$ only when $R_2$ is $OP(O)(O^-zM^{a+})OZ$; wherein said polyphenolic acid is selected from the group consisting of humic acids, lignosulfonic acids, lignins, tannins, oxidized humic acids, oxidized lignosulfonic acids, oxidized lignins, oxidized tannins, sulfonated humic acids, sulfonated lignins, sulfonated tannins, sulfomethylated humic acids, sulfomethylated lignins, sulfomethylated tannins, and mixtures thereof.

2. The oil base well working fluid of claim 1 wherein said phosphatide is a mixture of phosphatides where: $R_2 =$ c $R_1COO + d$ $OP(O)(O^-zM^{a+})OZ$; $Q = d$ $R_1COO + c$ $OP(O)(O^-zM^{a+})OZ$; $R_1$ is an aliphatic group containing from about 15 to about 17 carbon atoms; $R_3$, $R_4$, and $R_5$ are independently selected from the group consisting of H, $CH_3$ and $R_1CO$; and $c \geq 0$, $d \geq 0$, and $c + d = 1$.

3. The oil base well working fluid of claim 1 wherein said phosphatide is a mixture of phosphatides obtained from a vegetable oil.

4. The oil base well working fluid of claim 1 wherein said phosphatide is commercial lecithin, said commercial lecithin containing from about 30% to about 50% of a vegetable oil, from about 35% to about 70% of one or more phosphatides having the empirical formula $$R_1-CO-O-CH_2-CH(R_2)-CH_2-Q$$

where: $R_1$ is an aliphatic group containing from about 15 to about 17 carbon atoms; $R_2$ is selected from the group consisting of $R_1COO$ and $OP(O)(O^-zM^{a+})OZ$; Q is selected from the group consisting of $R_1COO$ and $OP(O)(O^-zM^{a+})OZ$; Z is selected from the group consisting of $xM^{a+}$, $C_6H_6(OH)_5$, and $CH_2-CH(Y)-N(R_3)(R_4)(R_5)y(A^{b-})v$; Y is selected from the group consisting of H and $COO(wM^{a+})$; $R_3$, $R_4$, and $R_5$ are independently selected from the group consisting of H, $CH_3$, and $R_1CO$; M is a cation selected from the group consisting of H, an alkali metal, an alkaline earth metal, ammonium, and mixtures thereof; A is an anion of valence b; y = 0 or 1; w, x, and z = 0 or 1/a where a is the valence of M; v = 0 or 1/b; and Q is $R_1COO$ only when $R_2$ is $OP(O)(O^-zM^{a+})OZ$; and from 0% to about 18% of other phosphatides.

5. The oil base well working fluid of claim 1, 2, 3, or 4 wherein said polyphenolic material is humic acid or a humic acid-containing material.

6. The oil base well working fluid of claim 1, 2, 3, or 4 wherein said polyphenolic material is lignosulfonic acid.

7. A method of decreasing the fluid loss of an oil base well working fluid which comprises adding to said oil base well working fluid from about 5 kg/m³ to about 150 kg/m³ of an organophilic polyphenolic material comprising an adduct of a polyphenolic acid-containing material, or a water soluble or colloidally dispersible salt thereof, and one or more phosphatides having the empirical formula $$R_1-CO-O-CH_2-CH(R_2)-CH_2-Q$$

where: $R_1$ is an aliphatic group containing from 8 to 29 carbon atoms; $R_2$ is selected from the group consisting of H, OH, $R_1COO$, and $OP(O)(O^-zM^{a+})OZ$; Q is selected from the group consisting of $R_1COO$ and $OP(O)(O^-zM^{a+})OZ$; Z is selected from the group consisting of $xM^{a+}$, $C_6H_6(OH)_5$, and $CH_2-CH(Y)-N(R_3)(R_4)(R_5)y(A^{b-})v$; Y is selected from the group consisting of H and $COO(wM^{a+})$; $R_3$, $R_4$, and $R_5$ are independently selected from the group consisting of H, aliphatic groups containing from 1 to 30 carbon atoms, and $R_6CO$; $R_6$ is an aliphatic group containing from 1 to 29 carbon atoms; M is a cation selected from the group consisting of H, an alkali metal, an alkaline earth metal, ammonium, and mixtures thereof; A is an anion of valence b; y = 0 or 1; w, x and z = 0 or 1/a where a is the valence of M; v = 0 or 1/b; and where Q is $R_1COO$ only when $R_2$ is $OP(O)(O^-zM^{a+})OZ$; wherein said polyphenolic acid is selected from the group consisting of humic acids, lignosulfonic acids, lignins, tannins, oxidized humic acids, oxidized lignosulfonic acids, oxidized lignins, oxidized tannins, sulfonated humic acids, sulfonated lignins, sulfonated tannins, sulfomethylated humic acid, sulfomethylated lignins, sulfomethylated tannins, and mixtures thereof.

8. The method of claim 7 wherein said phosphatide is a mixture of phosphatides where: $R_2 = c$ $R_1COO + d$ $OP(O)(O^-zM^{a+})OZ$; $R_1$ is an aliphatic group containing from about 15 to about 17 carbon atoms; $R_3$, $R_4$, and $R_5$ are independently selected from the group consisting of H, $CH_3$ and $R_1CO$; and $c \geq 0$, $d \geq 0$, and $c + d = 1$.

9. The method of claim 7 wherein said phosphatide is a mixture of phosphatides obtained from a vegetable oil.

10. The method of claim 7 wherein said phosphatide is commercial lecithin said commercial lecithin containing from about 30% to about 50% of a vegetable oil, from about 35% to about 70% of one or more phosphatides having the empirical formula $$R_1-CO-O-CH_2-CH(R_2)-CH_2-Q$$

where: $R_1$ is an aliphatic group containing from about 15 to about 17 carbon atoms; $R_2$ is selected from the group consisting of $R_1COO$ and $OP(O)(O^-zM^{a+})OZ$; Q is selected from the group consisting of $R_1COO$ and $OP(O)(O^-zM^{a+})OZ$; Z is selected from the group consisting of $xM^{a+}$, $C_6H_6(OH)_5$, and $CH_2-CH(Y)-N(R_3)(R_4)(R_5)y(A^{b-})v$; Y is selected from the group consisting of H and $COO(wM^a)$; $R_3$, $R_4$, and $R_5$ are independently selected from the group consisting of H, $CH_3$, and $R_1CO$; M is a cation selected from the group consisting of H, an alkali metal, an alkaline earth metal, ammonium, and mixtures thereof; A is an anion of valence b; y = 0 or 1; w, x and z = 0 or 1/a where a is the valence of M; v = 0 or 1/b; and Q is $R_1COO$ only when $R_2$ is $OP(O)(O^-zM^{a+})OZ$; and from 0% to about 18% of other phosphatides.

11. The method of claim 7, 8, 9, or 10 wherein said polyphenolic material is humic acid or a humic acid-containing material.

* * * * *